United States Patent
Lummitsch et al.

(10) Patent No.: US 9,139,071 B2
(45) Date of Patent: Sep. 22, 2015

(54) INSTALLATION AID FOR A VENTILATION NOZZLE AND A VENTILATION DUCT OF A MOTOR VEHICLE, VENTILATION NOZZLE, VENTILATION DUCT, AND DASHBOARD

(75) Inventors: Stefan Lummitsch, Ginsheim (DE); Helmut Nitzsche, Ober-Hilbersheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 202 days.

(21) Appl. No.: 13/357,899

(22) Filed: Jan. 25, 2012

(65) Prior Publication Data

US 2012/0192395 A1 Aug. 2, 2012

(30) Foreign Application Priority Data

Jan. 26, 2011 (DE) .......................... 10 2011 009 423

(51) Int. Cl.
  *B25B 1/24* (2006.01)
  *B60H 1/34* (2006.01)
  *B60H 1/00* (2006.01)

(52) U.S. Cl.
  CPC .. *B60H 1/34* (2013.01); *B60H 1/00* (2013.01); *B60H 2001/3492* (2013.01); *Y10T 29/53917* (2015.01)

(58) Field of Classification Search
  USPC .......................................................... 29/272
  See application file for complete search history.

(56) References Cited

U.S. PATENT DOCUMENTS 1,617,939 A * 2/1927 Burt .............................. 454/145
3,461,850 A * 8/1969 Oblander ...................... 123/556
3,878,597 A * 4/1975 Hoskins .......................... 29/271
3,898,921 A * 8/1975 Trube et al. ................... 454/154
D273,702 S * 5/1984 Widerby et al. ............. D23/393
4,476,618 A * 10/1984 Simonson, Jr. ................ 29/272

(Continued)

FOREIGN PATENT DOCUMENTS

CN          201405704 Y       2/2010
DE          10312079 A1      10/2003

(Continued)

OTHER PUBLICATIONS

UK IPO, British Search Report for Application No. 1200382.8, dated May 3, 2012.

(Continued)

*Primary Examiner* — Lee D Wilson
*Assistant Examiner* — Alvin Grant
(74) *Attorney, Agent, or Firm* — Ingrassia Fisher & Lorenz PC (57) ABSTRACT

An installation aid is provided for a ventilation nozzle and a ventilation duct of a motor vehicle, which are connected to during the installation, the installation arranged on the ventilation nozzle or the ventilation duct and having a material section, which protrudes forward in the installation direction beyond the ventilation nozzle or the ventilation duct when the installation aid is fastened on the ventilation nozzle or the ventilation duct and is at least partially insertable into the ventilation duct or the ventilation nozzle. Before the installation of ventilation nozzle and ventilation duct against one another, with the installation aid fastened on the ventilation nozzle, the material section is fixed in motion with respect to the ventilation nozzle or, if the installation aid is fastened on the ventilation duct, the material section is fixed in motion with respect to the ventilation duct.

14 Claims, 5 Drawing Sheets

(56) References Cited

U.S. PATENT DOCUMENTS

| | | | | |
|---|---|---|---|---|
| 4,701,989 | A | * | 10/1987 | Cayzer ............................ 29/271 |
| 5,003,866 | A | * | 4/1991 | Ricci ............................ 454/146 |
| 5,083,363 | A | * | 1/1992 | Ransom et al. ................. 29/523 |
| 5,115,995 | A | * | 5/1992 | Hunt ......................... 242/157 R |
| 5,156,568 | A | * | 10/1992 | Ricci ............................ 454/129 |
| 5,416,964 | A | * | 5/1995 | Thomas .......................... 29/271 |
| 5,586,541 | A | * | 12/1996 | Tsai ............................. 123/574 |
| 5,722,883 | A | * | 3/1998 | Schwarz ........................ 454/155 |
| 5,733,191 | A | * | 3/1998 | Lam et al. ..................... 454/290 |
| 6,244,952 | B1 | * | 6/2001 | Arold et al. ................... 454/145 |
| 6,409,590 | B1 | * | 6/2002 | Suzuki et al. ................. 454/143 |
| 6,554,696 | B2 | * | 4/2003 | Kowalski et al. ............. 454/155 |
| 6,589,110 | B2 | | 7/2003 | Tanabe et al. |
| 6,648,750 | B1 | * | 11/2003 | Wiseman ...................... 454/195 |
| 6,685,261 | B2 | * | 2/2004 | Brancheriau et al. ......... 296/208 |
| 6,739,969 | B2 | * | 5/2004 | Shin .............................. 454/155 |
| 6,808,451 | B2 | * | 10/2004 | Luik et al. ..................... 454/155 |
| 6,817,075 | B1 | * | 11/2004 | Kretzschmar .................. 29/272 |
| 6,974,377 | B2 | * | 12/2005 | Gehring et al. ............... 454/152 |
| 7,001,255 | B2 | * | 2/2006 | Ploeger et al. ................ 451/115 |
| 7,399,221 | B2 | * | 7/2008 | Masumoto et al. ........... 454/155 |
| 8,002,615 | B2 | * | 8/2011 | Jeong et al. ................... 454/139 |
| 2002/0062780 | A1 | * | 5/2002 | Chen ............................ 116/63 P |
| 2003/0211821 | A1 | * | 11/2003 | Driller .......................... 454/124 |
| 2005/0239390 | A1 | * | 10/2005 | Leopold ........................ 454/154 |
| 2005/0284362 | A1 | | 12/2005 | Kim et al. |
| 2006/0243823 | A1 | * | 11/2006 | Bachmann et al. ........ 239/284.1 |
| 2007/0184772 | A1 | * | 8/2007 | McConnell et al. .......... 454/139 |

FOREIGN PATENT DOCUMENTS

| | | | |
|---|---|---|---|
| DE | 60304419 T2 | | 4/2007 |
| DE | 102006029733 A1 | | 1/2008 |
| DE | 102007056167 A1 | | 5/2009 |
| JP | 2003285622 A | | 10/2003 |
| JP | 2003300411 A | * | 10/2003 ............ B60H 1/34 |
| JP | 2008105465 A | * | 5/2008 |
| JP | 2009139059 A | * | 6/2009 |
| KR | 20060004175 A | | 1/2006 |

OTHER PUBLICATIONS

China Patent Office, China Office Action for China Application No. 201210019234.1, dated Jan. 6, 2015.

* cited by examiner

INSTALLATION AID FOR A VENTILATION NOZZLE AND A VENTILATION DUCT OF A MOTOR VEHICLE, VENTILATION NOZZLE, VENTILATION DUCT, AND DASHBOARD

CROSS-REFERENCE TO RELATED APPLICATION

This application claims priority to German Patent Application No. 10 2011 009 423.7, filed Jan. 26, 2011, which is incorporated herein by reference in its entirety.

TECHNICAL FIELD

The technical field relates to an installation aid for a ventilation nozzle and a ventilation duct of a motor vehicle, connected to one another during the installation. Furthermore, the technical field relates to a ventilation nozzle or a ventilation duct for the heating system or air conditioner of a motor vehicle. In addition, the technical field relates to a dashboard for a motor vehicle.

BACKGROUND

In the course of the final assembly of a motor vehicle, the installation of the ventilation nozzles on the dashboard of the motor vehicle is often complex and requires great finesse. The connection area of ventilation nozzle and ventilation duct is also not externally accessible or externally visible in many cases, so that the insertion of the ventilation nozzle into a corresponding receptacle of the ventilation duct is difficult.

The ventilation nozzle is frequently oriented in such a way that the ventilation nozzle does not reach the receptacle of the ventilation duct when the ventilation nozzle is moved in the corresponding provided installation direction. The insertion of the ventilation nozzle into the dashboard is repeated until the free end of the ventilation nozzle reaches the receptacle of the ventilation duct and therefore proper connection of ventilation nozzle and ventilation duct is achieved.

In view of the foregoing, at least one object includes providing an installation aid for a ventilation nozzle and a ventilation duct of a motor vehicle, by which ventilation nozzle and ventilation duct can be installed against one another in a simple way. Furthermore, a corresponding ventilation nozzle and a corresponding ventilation duct are to be proposed. In addition, a dashboard is proposed, which is suitable for the installation of a ventilation nozzle or a ventilation duct using an installation aid. Moreover, other objects, desirable features, and characteristics will become apparent from the subsequent summary and detailed description, and the appended claims, taken in conjunction with the accompanying drawings and this background.

SUMMARY

An installation aid is provided for a ventilation nozzle and a ventilation duct of a motor vehicle, which are connected to one another during the installation, can be arranged on the ventilation nozzle or the ventilation duct. The installation aid has at least one material section, which protrudes forward in the installation direction beyond the ventilation nozzle or the ventilation duct and is at least partially insertable into the ventilation duct or the ventilation nozzle when the installation aid is fastened on the ventilation nozzle or the ventilation duct.

During the assembly of ventilation nozzle and ventilation duct, an orientation of ventilation nozzle and ventilation duct to one another is thus performed in such a way that the ventilation nozzle and the ventilation duct are in a predefined and intended orientation to one another and are connected to one another. The material section is insertable into the ventilation duct or the ventilation nozzle, threading of the ventilation nozzle is achieved in relation to the ventilation duct or vice versa. The installation aid therefore provides a guided movement that occurs in the course of the installation movement of the ventilation nozzle relative to the ventilation duct, so that at the end of the installation, the ventilation nozzle and the ventilation duct are in the predefined position location to one another and connected to one another.

If the installation aid is fastened on the ventilation nozzle, during the installation of the ventilation nozzle on the ventilation duct, the ventilation nozzle is threaded in relative to the ventilation duct with the installation aid. Vice versa, if an installation aid is fastened on the ventilation duct, threading in is performed from the side of the ventilation duct, in that the ventilation nozzle is placed on the outwardly protruding material section of the installation aid.

It is also provided that before the installation of the ventilation nozzle and the ventilation duct against one another with the installation aid fastened on the ventilation nozzle, the material section is fixed in movement relative to the ventilation nozzle. Alternatively, before the installation of the ventilation nozzle and the ventilation duct against one another with the installation aid fastened on the ventilation duct, the material section is fixable in movement relative to the ventilation duct. The material section thus remains, in relation to the ventilation nozzle or the ventilation duct on which the installation aid was fastened, essentially unchanged in its location relative to the ventilation nozzle or the ventilation duct during the threading. Guiding and connecting of ventilation nozzle and ventilation duct to one another is thus possible particularly well.

The ventilation nozzle and the ventilation duct can be properly installed against one another easily and with little effort by the installation aid. Even in a blind installation, for example, of the ventilation nozzle on a ventilation duct already installed on the dashboard of the motor vehicle, is readily possible with the installation aid. Through the installation aid, assembly of ventilation nozzle and ventilation duct in the predefined positions to one another is already achieved by a single installation step. Multiple installation attempts and the time expenditure connected thereto are effectively avoided by the installation aid.

It is advisable for the at least one material section to be dimensionally stable. This measure is intended so that the material section remains unchanged in its location upon action of installation forces, in particular greater installation forces, so that in spite of the acting forces, threading of the ventilation nozzle into the ventilation duct or vice versa is achieved with the material section of the installation aid. Furthermore, it is advisable for the at least one material section to be oblong, in particular rod-shaped. The material section thus has an aerodynamic shape, so that the air stream conducted through the ventilation duct and the ventilation nozzle is substantially uninfluenced by the material section. Rod-shaped should be understood as an oblong shape having cylindrical cross-section. Oblong shapes having a polygonal cross-section are also conceivable. Furthermore, it is advisable for the at least one material section to have an essentially uniform cross-section in the direction of its longitudinal extension. The material section is thus producible in a simple way.

One embodiment provides multiple material sections, which form a composite structure, which spans the opening of the ventilation nozzle or the ventilation duct when the installation aid is fastened on the ventilation nozzle or the ventilation duct. Due to the composite structure, the material sections are provided in a particularly durable and stable embodiment, so that threading of the ventilation nozzle onto the ventilation duct and vice versa is ensured with the installation aid in the event of active high installation forces. In that the material sections span the opening of the ventilation nozzle or the ventilation duct, the opening is also externally protected from mechanical interference effects. Mechanical parts inside the opening, such as flaps, are thus protected against any damage during the installation of the ventilation nozzle against the ventilation duct. For example, a closure flap arranged in the intake area of the opening can be protected from a ventilation hose running in this area, so that blocking of the rotational movement of the closure flap by the ventilation hose is avoided.

According to a further embodiment, it is provided that the material sections form a composite structure that tapers in cross-section in the installation direction when the installation aid is fastened on the ventilation nozzle or the ventilation duct. Threading into the passage of the ventilation duct or the passage of the ventilation nozzle is thus possible particularly simply. The composite structure formed by the material sections can be implemented as conical or pyramidal. An implementation like a truncated cone or truncated pyramid is also possible. The central axis of such a composite structure in the form of a cone, pyramid, truncated cone, or truncated pyramid is preferably in the movement direction of ventilation nozzle and ventilation duct during the connection to one another. It is advisable for the material sections to be connected to one another on their outwardly protruding end or end area. A particularly stable composite structure is thus implemented. Furthermore, it is advisable for the material sections to form a composite structure like a frame structure. An aerodynamic composite structure is implemented by the frame structure, which opposes the airflow flowing through the ventilation duct and the ventilation nozzle with a relatively low flow resistance.

According to a further embodiment, it is provided that the installation aid has a base section, by which the installation aid is connectable to the ventilation nozzle or the ventilation duct. The base section forms the connection part of the installation aid to the ventilation component on which the installation aid is fixed before the assembly of ventilation nozzle and ventilation duct. The base section therefore receives a flange function. It is advisable for at least one material section to be molded onto the base section. The installation aid is producible particularly easily in this way, since the installation aid can be molded from one piece.

According to an embodiment, it is provided that the base section is implemented as a peripheral profile, which is pluggable into or onto the opening of the ventilation nozzle or the ventilation duct. The installation aid can thus be connected particularly simply to the ventilation nozzle or the ventilation duct. If the ventilation nozzle or the ventilation duct has a polygonal cross-section, the base section is correspondingly implemented as at least partially polygonal. Furthermore, if the installation aid has multiple oblong material sections, the material sections each merge into a corner area of the base section. With a rectangular cross-section of the opening of the ventilation duct or the ventilation nozzle, the base section is preferably implemented as correspondingly rectangular. The material sections merging into the respective corner areas then form the shape of a pyramid or a truncated pyramid to one another, if the outer free ends of the material sections are provided connected to one another.

The base section has a passage opening in an interior due to the peripheral profile. The base section can be implemented like a peripheral frame, whose outer circumference is operationally linked to or pushed into the inner circumference of the ventilation duct or the ventilation nozzle. It is also possible that the peripheral base section has its inner peripheral surface operationally linked to the outer peripheral surface of the ventilation nozzle or the ventilation duct and is therefore pushed onto the ventilation nozzle or the ventilation duct for fastening.

According to one embodiment, it is provided that the base section has at least one outwardly protruding projection, which is used as a stop during the connection of the installation aid to the ventilation nozzle or the ventilation duct. The installation aid is thus brought into a predefined location on the ventilation nozzle or the ventilation duct. Due to the projection, the installation aid remains on the ventilation nozzle or the ventilation duct in the predefined location even if installation forces or any other interfering forces act externally on the installation aid.

According to a further embodiment, it is provided that the installation aid has fixing means, in particular a clamp, detent, and/or lock, in order to secure the installation aid against loosening from the ventilation nozzle or the ventilation duct. The installation aid is effectively held in its fixed position on the ventilation nozzle or the ventilation duct, so that loosening of the installation aid is avoided during the installation of the ventilation nozzle and the ventilation duct against one another.

The installation aid is preferably removable secured to the ventilation nozzle or the ventilation duct by the fixing device, so that the installation aid can also be removed again from the ventilation nozzle or the ventilation duct. Of course, the installation aid can also be permanently connected to the ventilation nozzle or the ventilation duct. The installation aid can be welded, glued, riveted, or screwed onto the ventilation nozzle or the ventilation duct. The installation aid can also be connected to the ventilation nozzle or the ventilation duct with a rivet connection or screw connection.

The installation aid is preferably a plastic part. The installation aid is preferably molded from one piece. The installation aid is preferably an injection-molded part.

According to an embodiment, a ventilation nozzle or a ventilation duct is provided for the heating system or air conditioner of a motor vehicle having an installation aid of the above-described type. The installation aid is preferably fastened, in particular removably fastened, on the ventilation nozzle or the ventilation duct.

According to another embodiment, a ventilation duct or a ventilation nozzle is provided for the heating system or air conditioner, which is used for the connection to an associated ventilation nozzle or an associated ventilation duct of the above-described type, the ventilation duct and/or the ventilation nozzle having a receptacle for receiving the installation aid of the above-described type, which is fastened on the associated ventilation nozzle or the associated ventilation duct. The ventilation duct is connectable to the associated ventilation nozzle and the ventilation nozzle is connectable to the associated ventilation duct by the receptacle, in each case the installation aid being able to remain arranged between them when the installation aid is received in the receptacle of the ventilation duct or the ventilation nozzle.

Furthermore, a dashboard is provided for a motor vehicle having at least one ventilation nozzle or at least one ventilation duct, of which the ventilation nozzle and/or the ventilation duct, is assigned an installation aid of the above-described type.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary of the following detailed description.

Figure 1:
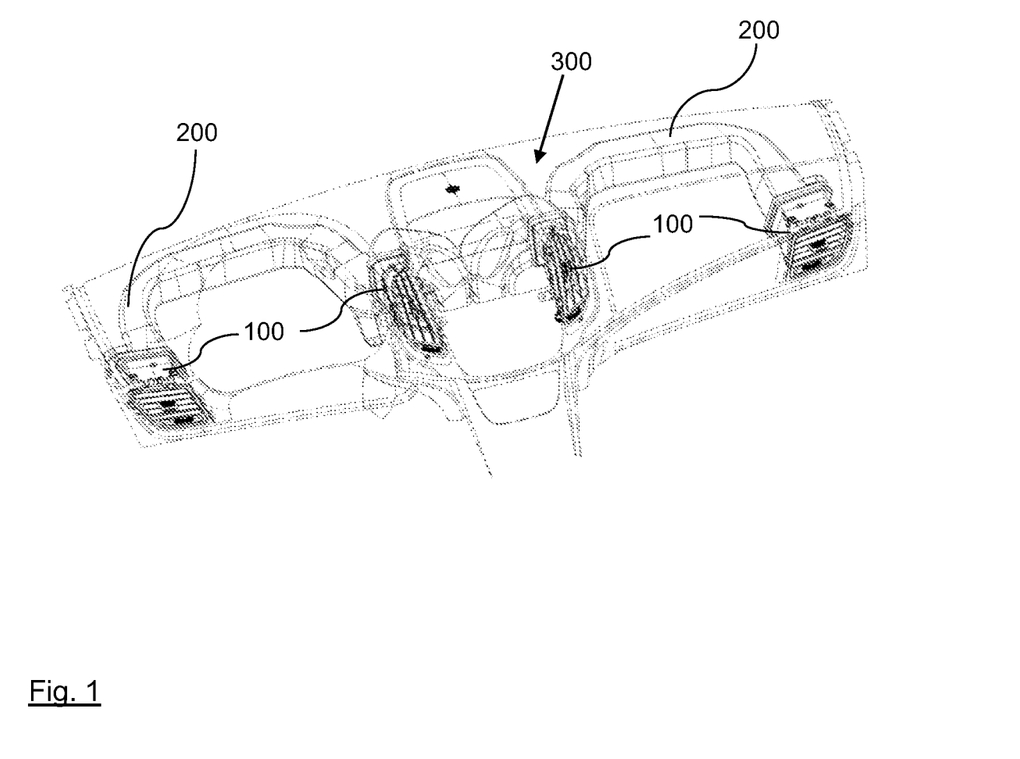
FIG. 1 shows a possible embodiment of a dashboard for a motor vehicle having ventilation ducts and multiple ventilation nozzles arranged thereon in a perspective view.

FIG. 1 shows, in a schematic view, a possible embodiment of a dashboard 300 for a motor vehicle. The dashboard has at least one ventilation duct 200 in each case on both sides. On the side of the dashboard 300 facing toward the passenger compartment, which is not shown in FIG. 1, the dashboard 300 has openings, in which ventilation nozzles 100 are mounted. The ventilation nozzles 100 are connected to the respective ventilation duct 200. An air stream, which is generated by the heating system or air conditioner, which is not shown in FIG. 1, of the motor vehicle, is thus conducted via the respective ventilation duct 200 and the respective ventilation nozzles 100 into the passenger compartment of the motor vehicle.

Figure 2:
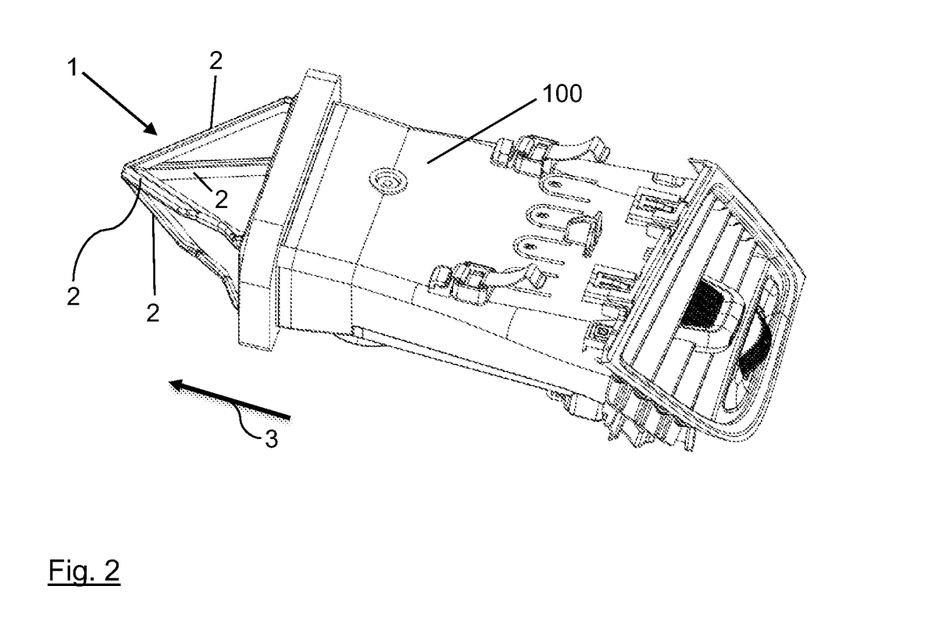
FIG. 2 to FIG. 4 show one of the ventilation nozzles according to FIG. 1 having an installation aid arranged thereon in various perspective views.
Figure 3:
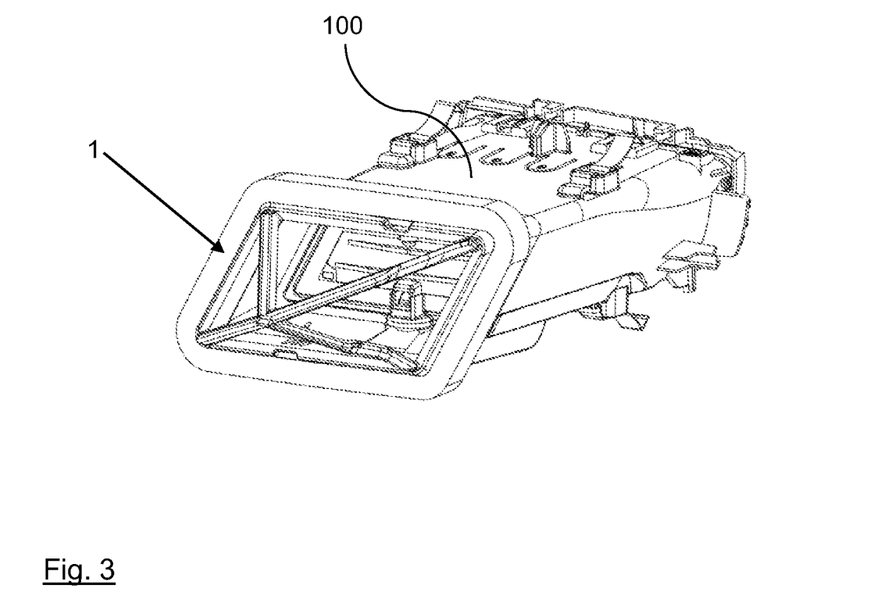
Figure 4:
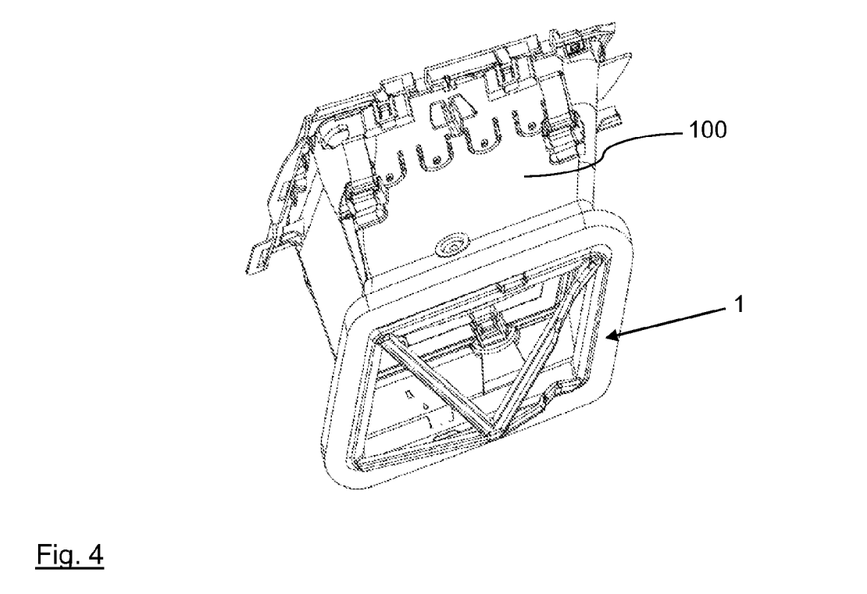
Figure 5:
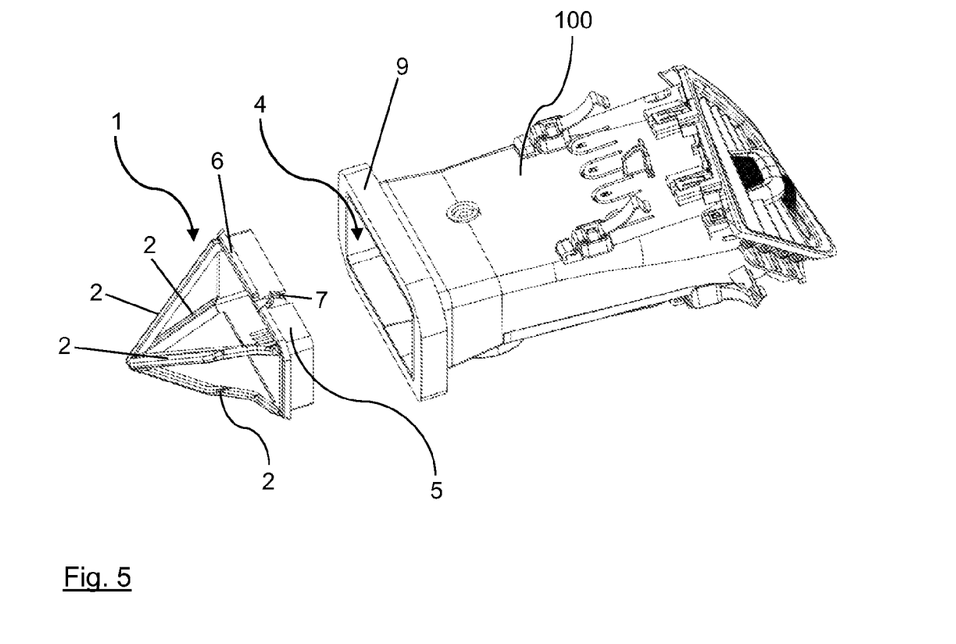
FIG. 5 shows the ventilation nozzle and the installation aid according to FIG. 2 to FIG. 4 in an exploded view.

FIG. 2 to FIG. 4 show one of the ventilation nozzles 100 of the dashboard 300 alone. The ventilation nozzle 100 is assigned to one possible embodiment of an installation aid 1. FIG. 5 shows the installation aid 1 and the ventilation nozzle 100 in an arrangement detached from one another in an exploded view.

As seen from FIG. 2 and FIG. 5, the installation aid 1 has multiple, in particular four material sections 2, which protrude forward in the installation direction 3 beyond the ventilation nozzle 100 when the installation aid 1 is fastened on the ventilation nozzle 100. The material sections 2 are implemented as oblong, in particular essentially rod-shaped having round or polygonal cross-section, and preferably dimensionally stable. The material sections 2 merge at their respective one end into a base section 5 of the installation aid 1, in particular. the material sections 2 are molded onto the base section 5. The material sections 2 are further connected to one another at their respective other end, in particular the material sections 2 are molded against one another at their respective other end.

Through the connection of the material sections 2 at their respective one end to one another and at their respective other end to the base section 5, a composite structure, in particular a frame-type composite structure is formed, which tapers in cross-section in the installation direction 3 when the installation aid 1 is fastened on the ventilation nozzle 100. The base section 5 is implemented as peripheral, preferably like a ring, so that the installation aid 1 is pluggable by means of the base section 5 into the ventilation nozzle 100.

The base section 5 can be implemented so that the outer circumference of the peripheral base section corresponds to the inner circumference of the opening 4 of the ventilation nozzle 100, or the inner circumference of the peripheral base section 5 corresponds to the outer circumference of the ventilation nozzle 100, so that it is possible to push the installation aid 1 onto or into the ventilation nozzle 100 with the base section 5. The base section 5 preferably has an essentially rectangular peripheral contour, since preferably the ventilation nozzle 100 also has a substantially rectangular contour of the opening 4. Other shapes of the base section 5 are also conceivable. The material sections 2 preferably merge into the corner areas of the peripheral base section 5, so that, for example, in the case of a rectangular peripheral base section 5, the composite structure formed by the material sections 2 has the shape of a pyramid.

As seen in FIG. 5 in particular, the base section 5 has a projection 6 on its end facing toward the material sections 2, which is used as a stop when the base section 5 is pushed into the opening 4 of the ventilation nozzle 100. The projection 6 is preferably implemented as an at least partially peripheral, outwardly protruding collar, web, or shoulder. Furthermore, the installation aid 1 has at least one fixing means 7, for example, like a clamp, detent, and/or lock, which is used to fix the installation aid 1 on the ventilation nozzle 100 in the predefined inserted position. The fixing device 7 can be arranged in the area of the base section 5, so that in the course of the pushing of the installation aid 1 into or onto the ventilation nozzle 100, the fixing device 7 is also operationally linked to the ventilation nozzle 100 with the base section 5.

In the area of the border of the opening 4, the ventilation nozzle 100 has a peripheral, outwardly protruding seal 9, which is used for the seal with the ventilation duct 200, which is not visible in FIG. 2 to FIG. 5. The ventilation duct 200 has a corresponding receptacle for this purpose, into which the ventilation nozzle 100 is inserted with its seal 9 during the assembly with the installation aid 1 interposed.

Figure 6A:
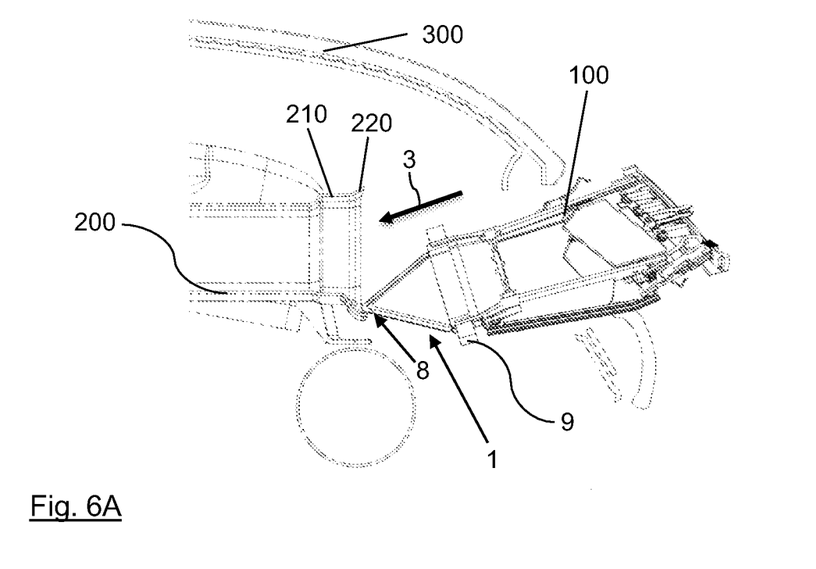
FIG. 6A to FIG. 6C show various steps during the installation of the ventilation nozzle with the installation aid according to FIG. 2 to FIG. 4 in a dashboard of a motor vehicle, shown in cross-sectional views.
Figure 6B:
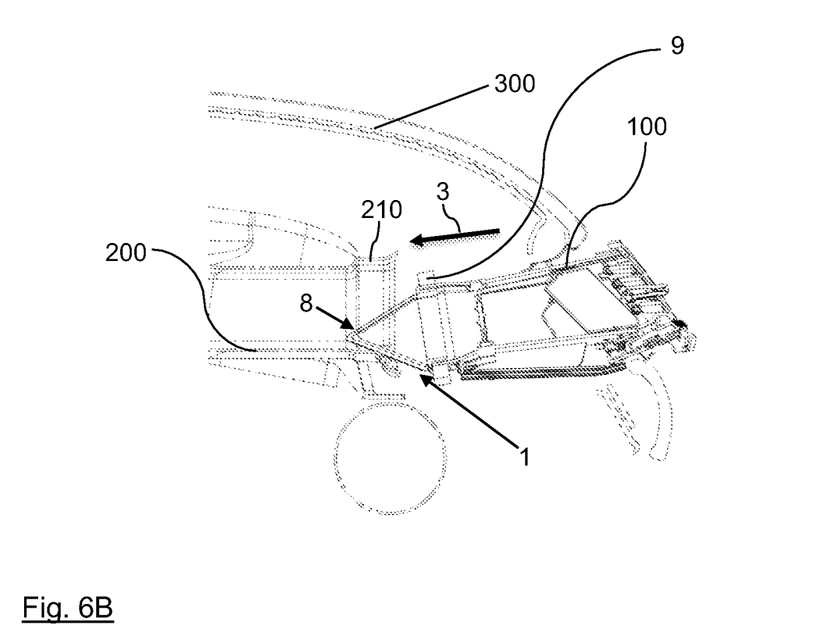
Figure 6C:
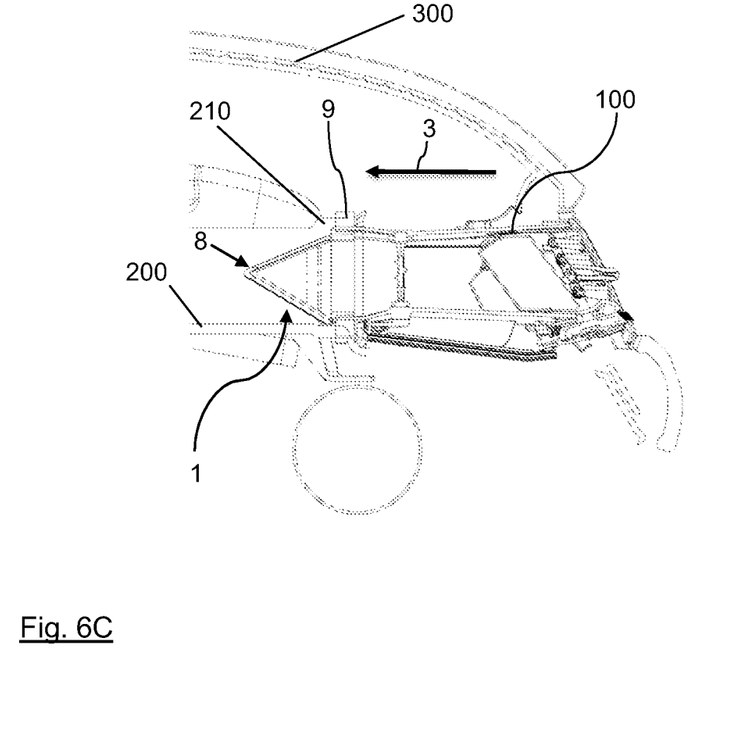

FIG. 6A to FIG. 6C show various steps of the installation of the ventilation nozzle 100 in the dashboard 300 with connection to the ventilation duct 200. From FIG. 6A, for example, the ventilation duct 200 has a receptacle for the seal 9 of the ventilation nozzle 100, which is provided therein with the reference sign 210. The receptacle 210 is formed by an end of the ventilation duct 200 that is widened in cross-section. The receptacle 210 preferably has an intake chamfer 220, which is preferably formed by widening the receptacle 210 on the outwardly protruding end of the ventilation duct 200.

As seem in FIG. 6A, during the insertion of the ventilation nozzle 100 having the installation aid 1 fixed thereon into the corresponding opening on the dashboard 300, the ventilation nozzle 100 is threaded by the forward protruding material sections 2 of the installation aid 1 into the ventilation duct 200. Threading is easily performed by the tip 8 of the installation aid 1 protruding forward in the installation direction 3 or feed direction and the intake chamfer 220 on the ventilation duct 200, so that as the ventilation nozzle 100 is pushed in further in the installation direction 3, the tip 8 of the installation aid 1 is guided via the intake chamfer 220 into the receptacle 210 and reaches the rear area of the ventilation duct 200 therefrom, as is obvious from FIG. 6B and FIG. 6C.

As FIG. 6C shows, at the end of the installation of the ventilation nozzle 100 in the dashboard 300, the ventilation nozzle 100 is also located in the predefined position in relation to the ventilation duct 200. In this predefined position, the peripheral web or flange of the ventilation nozzle 100 is received in the receptacle 210 of the ventilation duct 200, so that airflow reaches the ventilation nozzle 100 correctly via the ventilation duct 200 and can flow therefrom into the passenger compartment.

Through the installation aid, threading of the ventilation nozzle into the ventilation duct during the installation of the ventilation nozzle in the dashboard of a motor vehicle is made significantly easier. The installation of the ventilation nozzle can also be readily performed in blind installation. Substantial simplification of the installation of the ventilation nozzle in the dashboard thus results, so that time and installation costs may be saved.

While at least one exemplary embodiment is presented in the foregoing summary and detailed description, a vast number of variations exist. It should also be appreciated that the exemplary embodiment or exemplary embodiments are only examples, and are not intended to limit the scope, applicability, or configuration in any way. Rather, the foregoing summary and detailed description provides those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. An installation aid for a ventilation nozzle and a ventilation duct of a motor vehicle that are connected during an installation, comprising:
   a plurality of material sections each having an oblong shape that protrudes forward in a longitudinal installation direction beyond the ventilation nozzle or the ventilation duct when the installation aid is fastened on the ventilation nozzle or the ventilation duct and is at least partially insertable into the ventilation duct or the ventilation nozzle,
   wherein before the installation of the ventilation nozzle and the ventilation duct against one another, with the installation aid fastened on the ventilation nozzle, the material sections are fixed with respect to the ventilation nozzle, and with the installation aid fastened on the ventilation duct, the material sections are fixed with respect to the ventilation duct, and
   a base section that is configured to connect the installation aid to the ventilation nozzle or the ventilation duct,
   wherein the materials sections forma composite structure which tapers in cross-section in the installation direction.

2. The installation aid according to claim 1, wherein the at least one material section is dimensionally stable.

3. The installation aid according to claim 1, wherein the at least one material section is essentially rod-shaped.

4. The installation aid according to claim 1, wherein the composite structure spans an opening of the ventilation nozzle or the ventilation duct when the installation aid is fastened on the ventilation nozzle or the ventilation duet.

5. The installation aid according to claim 4, wherein the plurality of material sections are connected to one another on their outwardly protruding end areas.

6. The installation aid according to claim 1, wherein the base section is configured to plug into an opening of the ventilation nozzle or the ventilation duct.

7. The installation aid according to claim 1, wherein the base section comprises at least one outwardly protruding projection configured as a stop during connection of the installation aid to the ventilation nozzle or the ventilation duct.

8. The installation aid according to claim 1, further comprising a fixing device to secure the installation aid against loosening from the ventilation nozzle or the ventilation duct.

9. The installation aid according to claim 8, wherein the fixing device is a clamp.

10. The installation aid according to claim 9, wherein the fixing device is a detent.

11. The installation aid according to claim 8, wherein the fixing device is a lock.

12. The installation aid according to claim 1, wherein the composite structure formed by the material sections has a conical structure.

13. The installation aid according to claim 1, wherein at least one of the material sections is molded onto the base section.

14. The installation aid according to claim 1, wherein the material sections and the base section are one piece.

* * * * *